United States Patent [19]

Kneer

[11] 4,090,493
[45] May 23, 1978

[54] SOLAR HEATER

[76] Inventor: Manfred M. Kneer, P.O. Box 152, Icard, N.C. 28666

[21] Appl. No.: 758,392

[22] Filed: Jan. 11, 1977

[51] Int. Cl.² .............................................. F24J 3/02
[52] U.S. Cl. ................................... 126/270; 237/1 A
[58] Field of Search ................ 126/270, 271; 237/1 A

[56] References Cited
U.S. PATENT DOCUMENTS

| 1,003,514 | 9/1911 | Rountree | 126/271 |
| 1,047,554 | 12/1912 | Nichols | 126/271 |
| 1,683,266 | 9/1928 | Shipman | 126/271 |
| 1,814,897 | 7/1931 | Coxe | 126/270 |
| 1,855,815 | 4/1932 | Abbot | 126/271 |
| 3,964,464 | 6/1976 | Hockman | 126/270 |
| 4,015,584 | 4/1977 | Haberman | 126/270 |
| 4,027,651 | 6/1977 | Robbins, Jr. | 126/270 |
| 4,030,477 | 6/1977 | Smith | 126/270 |

Primary Examiner—John J. Camby
Assistant Examiner—Henry C. Yuen
Attorney, Agent, or Firm—Roy B. Moffitt

[57] ABSTRACT

Disclosed is a solar heater adapted to be made in modular units and used as such or alone, each unit comprising a container, generally triangular in cross section, made up of equal dimensional reflective (two in number) and transparent (one in number) sidewalls, plus two equal dimensional reflective end members of like cross section. Disposed in the container is a conduit and an enlargement of same, the geometric center of said enlargement being coincident with the geometric center of the container. The enlargement is spaced apart from the two reflective and the transparent sidewalls and as a result of the shape of the container and disposition of the enlargement in it, the enlargement is heated by solar rays from its top and its underside, thereby giving rise to a solar heater of significant efficiency.

8 Claims, 6 Drawing Figures

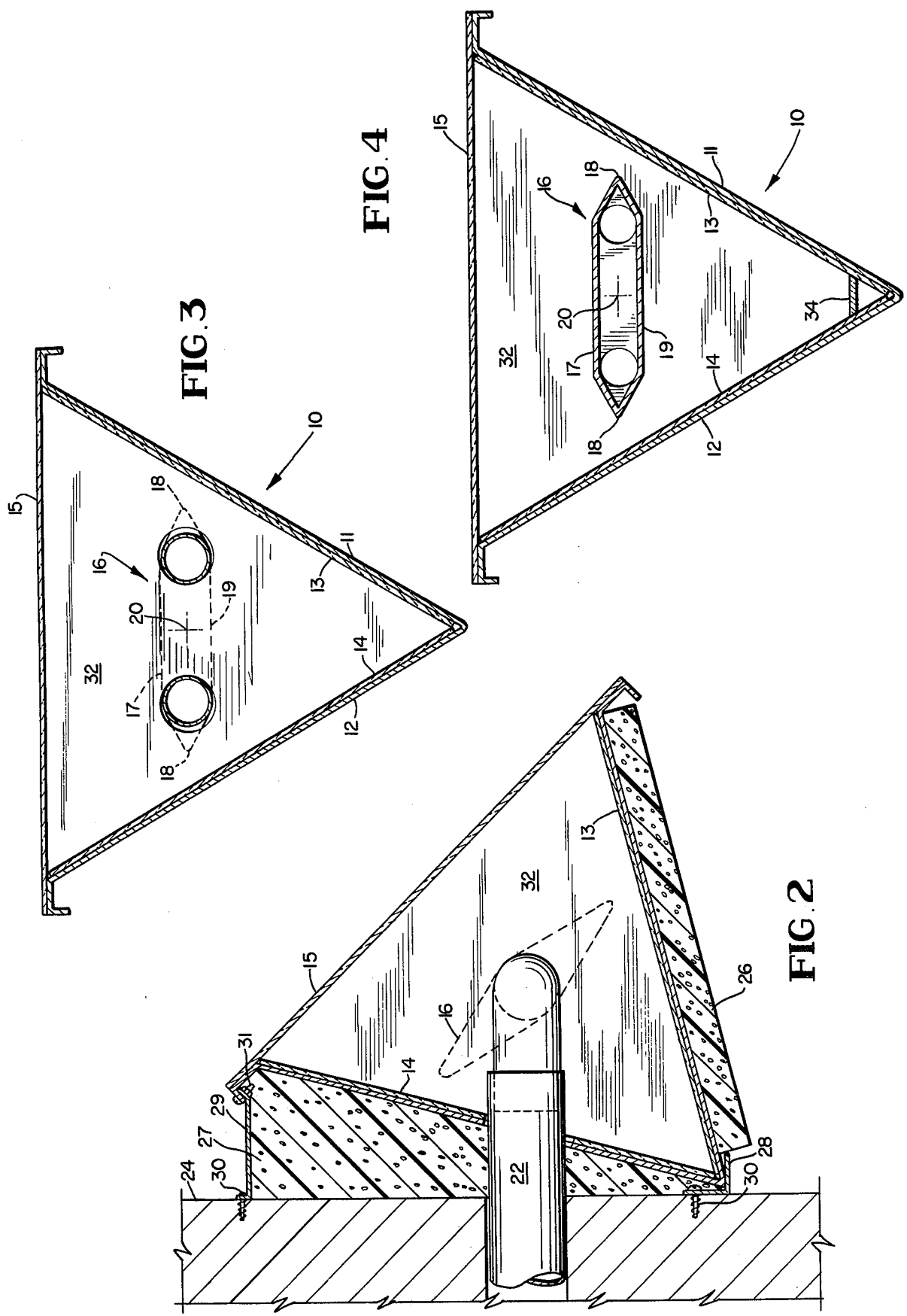

SOLAR HEATER

BACKGROUND OF THE INVENTION

1. Field of the Invention

The present invention relates generally to the method and apparatus of collecting, in a highly efficient manner, solar heat and more particularly relates to an apparatus for heating and cooling building structures, large and small.

2. Description of the Prior Art

The tremendous energy output of the sun has been recognized for many years and numerous attempts have been made at harnessing and converting it for useful purposes. The present high cost of energy (fuel oil, natural gas, electricity, to name a few), has focused attention on solar energy as an adjunct to heating systems that employ energy from one of the forementioned. The sun's energy has been successfully converted into electrical energy with solar batteries and similarly the sun's energy has been converted into heating systems by so-called solar stoves, heaters, furnaces and the like. Prior art solar furnaces, however, have been typlified by an extremely large collector plate, heated only on one side, covering large portions of a roof structure. These furnaces also require large storage chamgers, usually in the substructure of the building, where the heat is stored after having been transferred from the collector by a fluid median. The heat in the storage chamber is then circulated through the building by a fluid.

Most of the prior art systems have suffered from two major disadvantages. First, they required a significant amount of capital investment, their savings of conventional energy could only be forecasted to pay back to the investor his investment within ten years or more. Secondly, the solar heaters of the prior art were grossly inefficient, averaging only 20% or less, contributing to the long pay back.

Prior art systems, which not only have been large in size and very expensive to install, have proven to be very inefficient, such inefficiency contributing to their large size. Initially, these systems have not been capable of being easily installed in existing building structures and have been useful only as an auxiliary heating unit to a structure having conventional forced air heating systems.

Typical examples of prior art solar heating systems may be found in the June, 1973 and October, 1973 *Popular Mechanics Magazine* and in the May, 1973 issue of *Popular Science Magazine*. In addition and more particularly germane to the solar heating hereinafter described are the following U.S. Pat. Nos. 748,696; 1,003,514; 1,814,897 and 3,964,464.

OBJECTS OF THE INVENTION

The present invention has for its primary object a new and improved apparatus for collecting and transmitting solar energy.

Another object of the present invention is to provide a compact, self-contained solar heating unit adapted to be positioned exteriorly on a building structure and with minimum time and expense connected to the building structure so as to convert solar radiation into heat for maintaining a desired temperature within.

Another object of the present invention is to provide a new and improved solar heating system, readily connected to a building structure having either no existing heating system, an existing forced air heating system, or a heating system of another type (electric or steam for example) so as to serve as an auxiliary heating system with minimum alteration to the existing building structure.

It is another object of the present invention to provide a new and improved solar heating system, readily connected to the building structure, a mobile home or trailer, to serve as an auxiliary heating system with minimum alteration to the existing structure.

Still another object of the present invention is to provide a new and improved solar heating system which can be connected to a cooling or a hot water heating system with a minimum of physical or mechanical alterations.

It is another object of the present invention to provide a solar heater of modular construction, one modular unit adapted to be connected to another. Disposed in the modular unit is a collector plate having its geometric center coincident with the geometric center of the modular unit, the modular unit itself being triangular in shape to maximize the efficiency of incoming solar rays.

SUMMARY OF THE INVENTION

The foregoing and other objects of this invention are achieved in accordance with the present invention by using a collector disposed in a container. The container is composed of three sides, two sides being composed of light reflecting and the third side being composed of light transmitting materials, and two end members also made from light reflecting materials. The three sides are essentially equal dimensional, thus, forming a container having an isosceles triangle-shaped cross section. The geometric center of the collector is essentially coincident with the geometric center of the isosceles triangle formed by the three sides. Such an arrangement permits incoming solar rays to: impinge upon and then reflect from the collector itself, thus heating it on its upper side, and reflect from the reflective sidewalls and thereafter meet in a common zone, spaced apart from and beneath the collector. Since the collector is spaced apart from not only this zone but also the transparent sidewall, there is an effective entrapment of incoming solar rays beneath the collector thus heating it from below, thereby contributing considerably to the efficiency of the unit.

It has been found that a solar heater of this type reaches its maximum efficiency when a collector sees itself the maximum number of times. When two mirrors are disposed at an angle one to another, in the manner of the two reflective sidewalls of the instant invention, the maximum number of images of the collector achieved is 6. This happens when the included angle between and formed by the two reflective sidewalls is essentially 60° ± 5° and the collector is in the geometric center of the area formed by the reflective and transparent sidewalls. When the included angle is 45° and 75° the maximum number of images observed were 4.5 and 5 respectively. The maximum number of images equals the maximum amount of solar energy; thus, 60° equals maximum efficiency.

A solar heating system envisioned by the instant invention is customarily made up of modular units of approximately 42 inches in length, the two reflective and light transmitting sidewalls being 12 inches in width and essentially equal dimensional. An incoming conduit attached to a blower, which in turn is attached to appropriate thermostatic and termperature controls, forces air through the conduit into a collector (an enlargement of the conduit) wherein the air is heated. Heated air is either discharged back through another portion of the conduit into the building itself to form a radiator or is passed into another solar module of like dimensions where the air receives additional heat. This modular concept can be repeated as often as requirements and expenditures dictate.

It is quite obvious that once the air is heated it can be blown directly into a room for the purpose of maintaining a comfortable temperature or it can be used to heat conventional air condition apparatus so as to cool the rooms in a manner well known. Furthermore, such hot air could be used to heat water for subsequent storage and use, much in the same fashion as is well known in the prior art.

BRIEF DESCRIPTION OF THE DRAWINGS

FIG. 2 shows a sectional view of the invention taken along the line 2—2 of FIG. 1 showing the manner in which the heater is attached to a wall of a house or other building structure.

FIG. 3 is a sectional view of the invention taken along the line 3—3 of FIG. 1.

FIG. 4 is a sectional view of the device of FIG. 1 taken along the line 4—4.

DESCRIPTION OF THE PREFERRED EMBODIMENT

Figure 1:
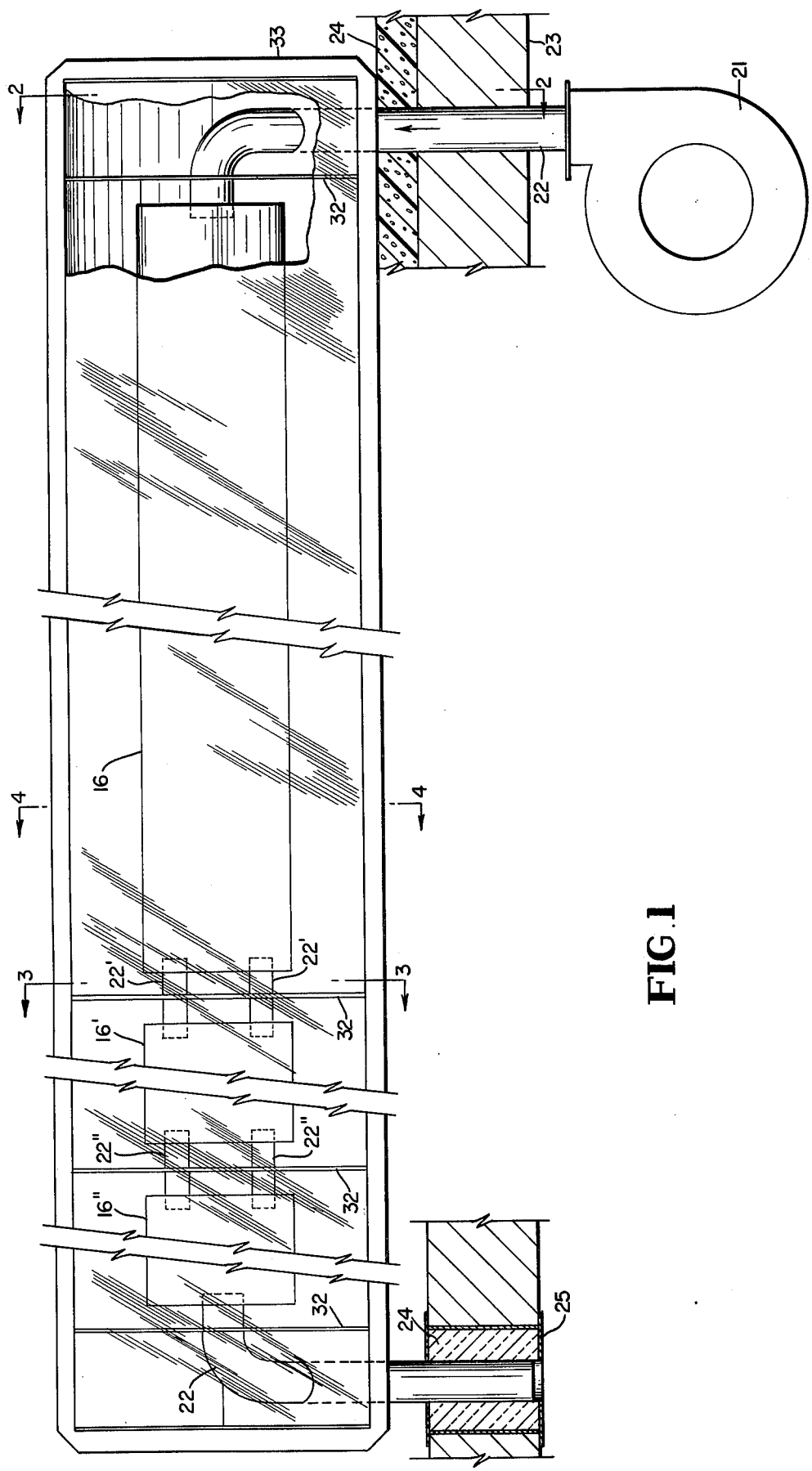
FIG. 1 is a top plan view of the solar furnace of this invention showing three modular units connected one to the other, all such units being connected to the wall of a building structure and acting as a self contained heater and radiator.

Referring to the several drawings in detail, the invention comprises an outer enclosure modular assembly ("container" herein), shown generally at 10, which is composed of essentially equal dimensional sidewalls 11, 12 and 15 and end members 33. Two sidewalls are shown as elements 11 and 12 and can be made from 16 gauge aluminum. The innermost side of sidewalls 11 and 12 ("reflective sidewalls" herein) can be made from glass mirrors approximately 0.047 inches thick, shown as elements 13 and 14.

Sidewall 15 can be made from ordinary window glass approximately 3/32 of an inch thick. Reflective sidewall 13 together with aluminum frame 11 form a laminate. The same applies to reflective sidewall 14 and aluminum frame 12. Such laminae can be achieved using any conventional means, e.g. either by mechanical affixing the reflective to the metallic portion or by using suitable adhesives or glues.

Reflective sidewalls 13 and 14 and transparent sidewall 15 are essentially equal dimensional; thus, when joined one to another they form a container 10 having a cross section that is essentially an isosceles triangle, the three included angles of such, as any schoolboy knows, equalling 60°. It has been found, however, that the 60° included angle formed by and between reflective sidewalls 13 and 14 can vary ±5° and still maintain the desired efficiency. However, the closer the true isosceles triangle cross section, the higher the efficiency.

While the triangular shaped cross section of the container is important, the relationship between the container and the collector plate ("enlargement" herein) is equally important. The enlargement is shown generally as element 16 and can be made of aluminum of approximately 0.020 inches thick. Preferably, its surface is colored black for optimum collection of the sun's rays, and it has a cross section, the dimension of the transverse axis being greater than the dimension of the vertical axis. Enlargement 16 is spaced apart from transparent sidewall 15 and the transverse terminus 18 of the enlargement is spaced apart from the reflective sidewalls. Most importantly, however, the geometric center 20 of enlargement 16 is coincident with the geometric center of container 10.

With enlargement 16 disposed in container 10 as described above, reflective sidewalls 13 and 14 reflect six images of it; thus, indicating that the maximum amount of radiation is being received in the container and the maximum efficiency is being achieved.

FIG. 1 shows blower 21 attached to conduit 22, which passes through wall 23. Blower 21 can be connected to appropriate thermostatic controls connected to appropriate thermo sensing devices, which sense the temperture of the sidewalls (elements 17 and 19), the interior of the enlargement or the air outside of it, generally below it. Such controls can be designed to permit activation of the blower only when the temperature of the air outside of and just below the enlargement reaches 100° F. Such arrangement keeps the solar heater from being activated during the night time and yet would permit it to come on during the daytime as a function of the amount of solar energy being captured. Conduit 22 passes through aluminum frame 11 and sidewall 13 and into enlargement 16 where it terminates just inside thereof. As shown in FIG. 1, three modular units are fastened, one to another, and the heated air from enlargement 16 is forced through conduits 22' into enlargement 16' where additional heat is imparted to the air and thence from enlargement 16'0 through conduits 22" into enlargement 16", where still additional heat is imparted to the air and thence from enlargement 16" through conduit 22, which passes through wall 23, and thence to a register inside of a house, a hot water heater, or an air conditioning means (the latter two not being shown).

As conduit 22 passes through the wall 23 it is good practice to use insulation 24 to pack around it to cut down on heat loss. To accomplish this and make things more convenient, a coverplate 25 can be used. A description of the coverplate and insulation is not felt to be necessary because it is believed these are well within the skill of the ordinary artisan, well known in the art, and form no part of the instant invention.

In FIG. 2, container 10 is shown attached to the wall using foam insulation or any other convenient insulation 26 and 27 between it and the wall 24. Mounting brackets 29 and 28 employing conventional screws or other devices and nuts and bolts 30 and 31 can be used to affix the container and foam to the wall. Container 10 is attached to wall 24 at an angle, preferably on the southern and/or sunny side of any structure. Using the vertical center line of the container as a reference, it should be inclined from the vertical 43.5°. The value of this angle is derived by using the following formula: Latitude of the geographic area where the solar heater is to be used plus 7.5°. For Hickory, N.C., U.S.A. having a latitude of 36°, the preferred angle is 43.5° (36° + 7.5°).

By fixing the 43.5° angle pursuant to the disclosed formula, an optimum heating arrangement is achieved for the winter months of September, October, November, December, January, February and March, i.e. the sun's rays deviate from a 90° impingement on the enlargement 16 by no more than 15°. Since the balance of the months require less heating, a greater deviation than the aforementioned 15° can be tolerated. Obviously for purposes of cooling (summer months) an appropriate like adjustment can be made if desired.

The disclosed solar heater is so efficient that in normal usage (North American Continent) focusing the unit with respect to incoming light rays is not necessary so long as the angle of incident of incoming rays is ±25° relative to an axis passing through the geometric center of element 16 and the transverse midpoint of element 15 (vertical center line of container 10). Hand or motor powered focusing means (not shown) could be employed if such were desired.

If modular units are connected one to the other, as shown in FIG. 1, dividers 32 have been found to be convenient made from 16 gauge aluminum. Dividers 32 preferably are made of blackened sheet aluminum and when disposed at nearly right angles to the sun will act as collectors and contribute towards the efficiency of the device. Container 16 not only has three equal dimensional sidewalls as previously described, but also two end members 33, which can be from the same type and thickness of material used to make elements 11 and 12 (16 gauge aluminum). The innermost surfaces of these end members can be laminated using a reflective substance such as a glass mirror as previously disclosed for elements 13 and 14. Conduit 22 can be made from copper or aluminum or any other suitable metallic and/or plastic substance.

In FIG. 4, there is shown an optional embodiment, namely, a small mirror 34 disposed near but spaced apart from the juncture of reflective sidewalls 13 and 14. Mirror 34 helps to reflect some of the light rays back towards the enlargement 16.

In summary, container 10 accomplishes the following objectives:

(1) It is an effective insulation barrier, acting to contain heat within it, such being achieved by the foam elements 26 and 27.

(2) It is an effective reflector and reflects the maximum amount of solar radiation against the underside of collector 16. This is achieved by geometric centering of enlargement 16 coincident with the geometric center of container 10 in combination with an appropriate choice of dimensions (transverse and vertical axis) of the collector itself.

Figure 6:
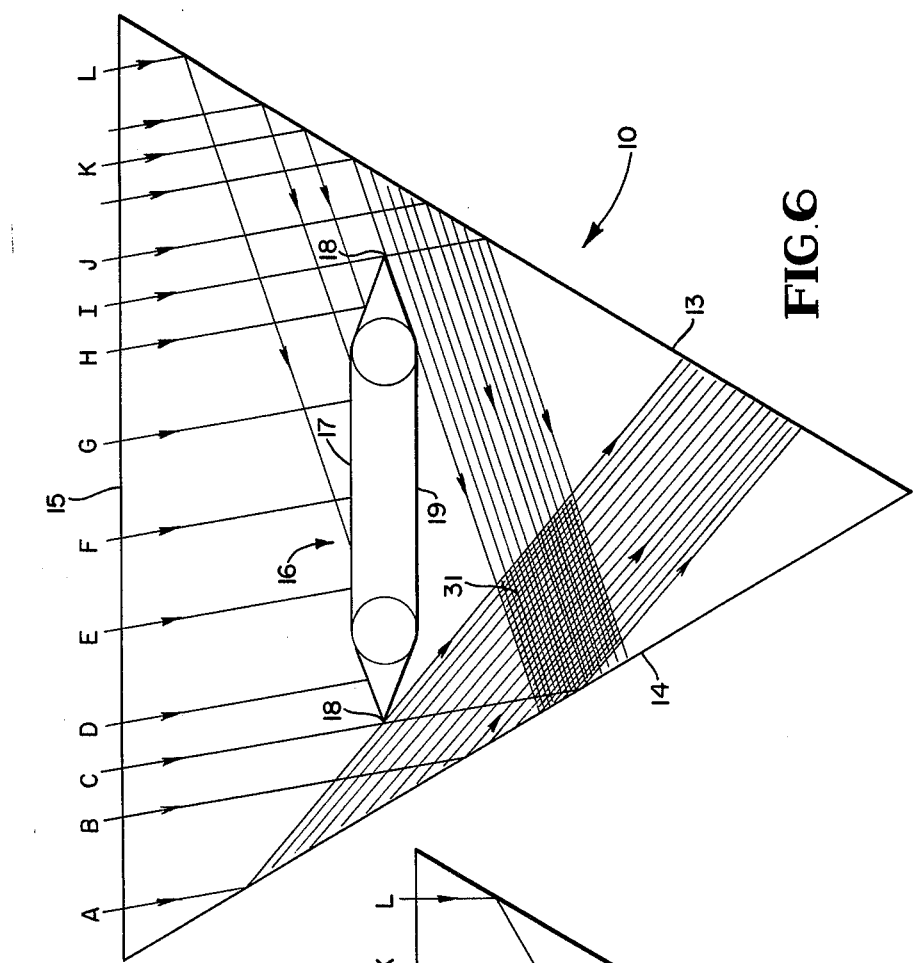
Figure 5:
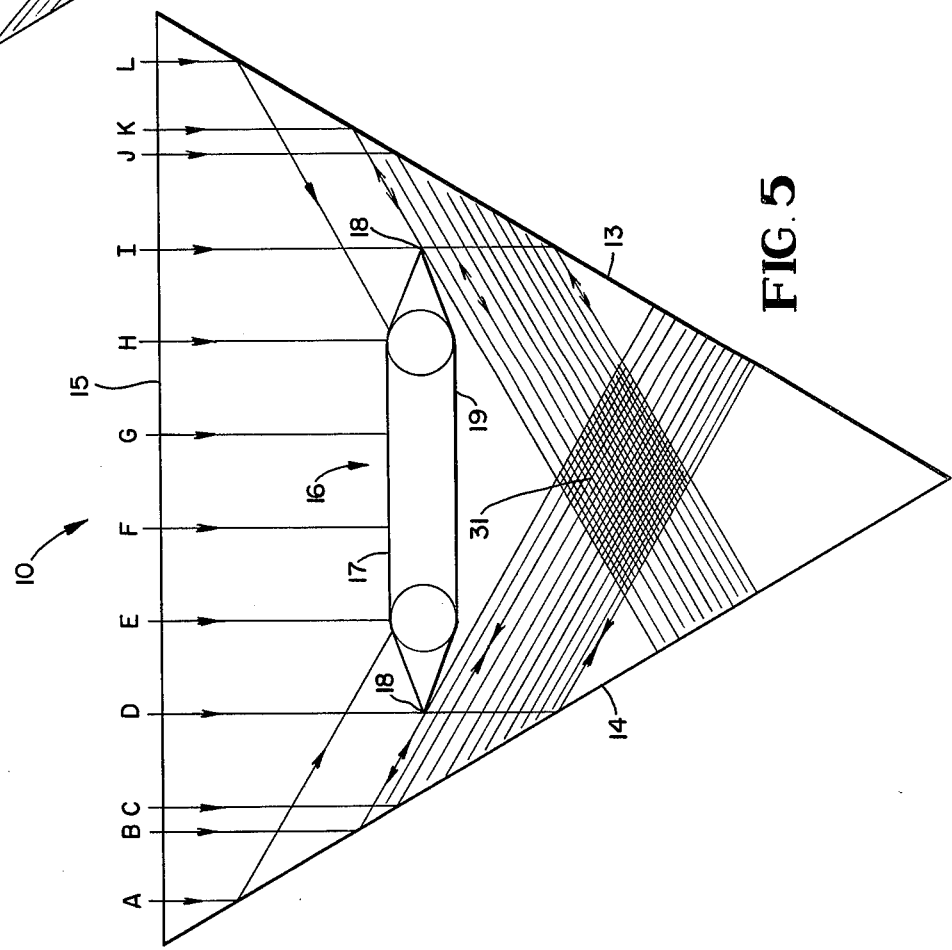
FIG. 5 is a sectional view taken along line 4—4 showing the sun rays entering the solar heater at 90° and forming a glare zone below the collector (conduit enlargement); and, FIG. 6 is the same sectional view as FIG. 5, but showing solar rays entering at 80°.

Reference is made to FIGS. 5 and 6. Here is shown a pictorial description of what applicant believes to be the theory of his invention. In FIG. 5 there is shown in cross sectional form, container 10 together with the geometrically centered enlargement 16 and light rays A, B, C, D, E, F, G, H, I, J, K and L striking transparent sidewall 15 at essentially 90° angle. Light rays G directly impinge upon enlargement 16 and heat its upper surface 17. More importantly, light rays A, B, C and D ("Group 1" herein) and I, J, K and L ("Group 2" herein) contribute to the efficiency of the disclosed invention by heating the under side 19 of enlargement 15, impinge upon reflective sidewall 14 in the same manner as light rays of Group 2 impinge upon sidewall 13. After the light rays of Group 1 impinge upon sidewall 14, they are reflected to a zone 31 below and spaced apart from enlargement 16. Light rays of Group 2 in like manner impinge upon reflective sidewall 13 and pass to zone 31. It is found that zone 31 is of a light intensity greater than the light intensity of the rays of Groups 1 and 2 respectively. To the naked eye, zone 31 is a glare.

If enlargement 16 were to be moved from its preferred position in an upward or downward manner, zone 31 would "follow" such movement. Consequently, enlargement 16 never could be placed in the middle of zone 31, notwithstanding the fact that such would be the most desirable. Zone 31 is obviously hotter than any other area inside container 10 because of the increased light intensity. Nonetheless, solar energy, as a matter of speaking, is entrapped beneath enlargement 16 and cannot easily escape because of the position and size of the enlargement, i.e. lateral terminus of enlargement 16 with respect to reflective sidewalls 13 and 14. Obviously, some solar energy does reflect back out of container 10 from beneath enlargement 16; however, such escaping solar energy is small in comparison to the amount of solar energy that is put to useful heating of the underside of enlargement 16 and thus the air inside of it. As has been previously stated, by changing the included angle between reflective sidewalls 13 and 14 of container 10 ± 5°, such does not decrease the efficiency of this device to an appreciable extent.

With reference to FIG. 5, applying the basic law of optics, ray (A) penetrating transparent sidewall 15 at an angle of 90° will be reflected by reflective sidewall 14 at the same angle as the incoming angle, in this instance 30° (90° − 60°). Since the included angles of the container are essentially 60° and the sum of all the angles of the triangle equals to 180°, the second point of radiation impact will be at 90° [(180° − 60° + 30°) equals 90°]. This occurrence will take place from both reflective sidewalls 13 and 14, resulting in a considerable amount of trapped radiation shown as zone 31. With respect to FIG. 6, a variance of incoming radiation at an angle not equal to 90° will result in a somewhat lessened heating effect.

Fig. 6 is a pictorial representation of essentially the same phenomenon previously described with respect to FIG. 5; however, in this Figure, the light rays A through L inclusive impinge upon the transparent sidewall 15 at an angle of 80° rather than an angle of 90°, as was the case in Fig. 6.

It is essential that enlargement 16 be spaced apart from transparent sidewall 15 a minimum distance equal to at least the dimension of its vertical axis. Furthermore, terminus 18 of enlargement 16 must be spaced apart from sidewalls 13 and 14. If they are too close, two things happen: first, there is heat transfer from enlargement 16 to elements 13 and 14. Second, there is not enough radiation passing enlargement 16, light rays of Groups 1 and 2, to heat its underside. Without zone 31 beneath enlargement 16, it is not heated from both sides and the efficiency of the unit is reduced significantly. Light rays E, F, G, H and I heat enlargement 16 from the top and the light rays from Groups 1 and 2, meeting in zone 31 heat it from below. The optimum dimension of the transverse axis of enlargement 16 has been found, by experimentation, to be at least one third of and no more than one half of the transverse dimension of sidewall 15, i.e. that portion of sidewall 15 forming the triangular cross section, not the over hang. Actual experimentation with the disclosed invention on a house located in Hickory, N.C., revealed the following:

(1) In the morning when the sun rays were at a relative flat angle, a 35% efficiency was achieved; (2) At noon, when the rays of the sun were more or less vertical or as near vertical as a geographical location would permit, a 61.5% efficiency was achieved; and (3) In the evening when the light rays were approaching the same flat angle as was experienced in the morning, a 20% efficiency was achieved. These efficiencies were obtained with a positioned fixed solar heater, i.e. its vertical axis was positioned fixed at an angle 43.5°% from the horizontal throughout the day. In comparision to other solar energy systems, the disclosed collector collected approximately two times the heat in similar environments.

Other investigators in the solar energy field have used a container surrounding a conduit enlargement such as that disclosed by applicant, namely Roundtree in U.S. Pat. No. 1,003,514. However, Roundtree did not position his collector in the geometric center of his container and his container had a trapazoid rather than a triangular cross section. Roundtree thus failed to appreciate the efficiency that can be obtained from the placement of a solar energy collector in the manner as disclosed. In 1931, Coxe in U.S. Pat. No. 1,814,897, disclosed a solar heater employing air as the heated fluid; but, Coxe overlooked the novel features disclosed in the invention. He used a parabolic mirror to focus light rays, much in the fashion of a magnifying glass. The incoming and thus reflected light rays were focused onto a small segment of a collector and this focusing had to be maintained during daylight hours. Both of these solar heaters were low in efficiency in comparison with that disclosed by this invention.

I claim:

1. A solar heater comprising a fluid conduit and a container, said container having essentially equal dimensional flat transparent and first and second light reflecting sidewalls attached together to form a container having a triangular cross section, at least one segment of said conduit having an enlargement enclosed in said container, the dimension of the transverse axis of said enlargement being no less than one third and no more than one half of the transverse dimension of said transparent sidewall, the surface of the enlargement nearest said transparent sidewall being spaced apart from same by a distance of no less than the dimension of the vertical axis of said enlargement, and the terminal edges of said enlargement nearest said reflective sidewalls being spaced apart therefrom.

2. The solar heater as described in claim 1 wherein there is a blower connected to said conduit adapted to force fluid through it and said enlargement.

3. The solar heater as described in claim 1 wherein the color of the outermost surface of said enlargement is black.

4. The solar heater of claim 1 wherein said enlargement is positioned in said container so that at least a total of six images or same are reflected from said reflective sidewalls.

5. A solar heater of claim 1 wherein at least one included angle in said triangular crossection is substantially 60°.

6. A solar heater of claim 1 wherein at least one included angle in said triangular crossection is not less than 55° or more than 65°.

7. A solar heater of claim 1, wherein the color of the outermost surface of said enlargement is black.

8. A solar heater of claim 1 wherein the geometric center of said enlargement enclosed in said container is substantially coincident with the geometric center of the container.

* * * * *